United States Patent

[11] 3,567,897

[72] Inventor   Kiyoshi Inoue
                100 Sakato, Kawaski, Kanagawa, Japan
[21] Appl. No.  719,288
[22] Filed      Mar. 11, 1968
[45] Patented   Mar. 2, 1971
[32] Priority   Mar. 17, 1967
[33]            Japan
[31]            42/16756 and 42/16757

[54] HEATING THE UNDERSURFACE OF A CONDUCTIVE BODY BY ELECTRIC CURRENT CONDUCTED THERETO BY A SHAPED STREAM OF ELECTROLYTE
5 Claims, 19 Drawing Figs.

[52] U.S. Cl. ................................... 219/71,
                            204/143, 219/68, 219/69
[51] Int. Cl. .................................... B23p 1/04,
                                                   B23p 1/08
[50] Field of Search .......................... 219/71, 68,
     69 (E), 69 (D), 69 (M), 69 (F), 69 (G), 69 (V), 69
                                        (C); 204/143 (ECM)

[56]                References Cited
                UNITED STATES PATENTS
499,964    6/1893   Burton et al. ................ 219/71
                   FOREIGN PATENTS
7,226      0/1892   Great Britain ............... 219/71

Primary Examiner—R. F. Staubly
Attorney—Karl F. Ross

ABSTRACT: In a system for applying a predetermined pattern to the surface of a metallic workpiece a tubular electrode is prepared with a cross section transverse to the direction of flow of an electrolyte through the electrode, corresponding to the desired pattern. A jet of electrolyte is trained upwardly from this tubular electrode against the underside of the workpiece at a distance of 0.1—10 mm therefrom while an electrolytic heating current is applied between the electrode and the workpiece. The pattern corresponding to the electrode cross section is found to be formed on the workpiece surface.

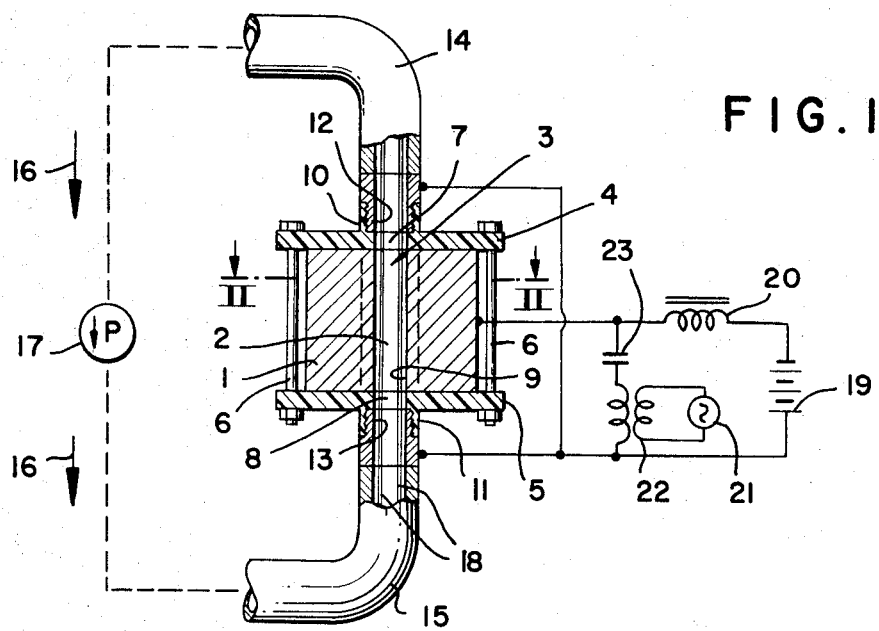
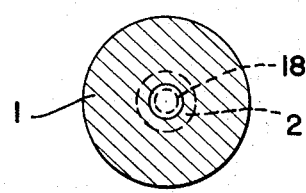
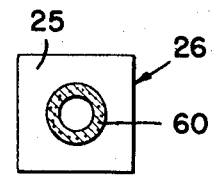
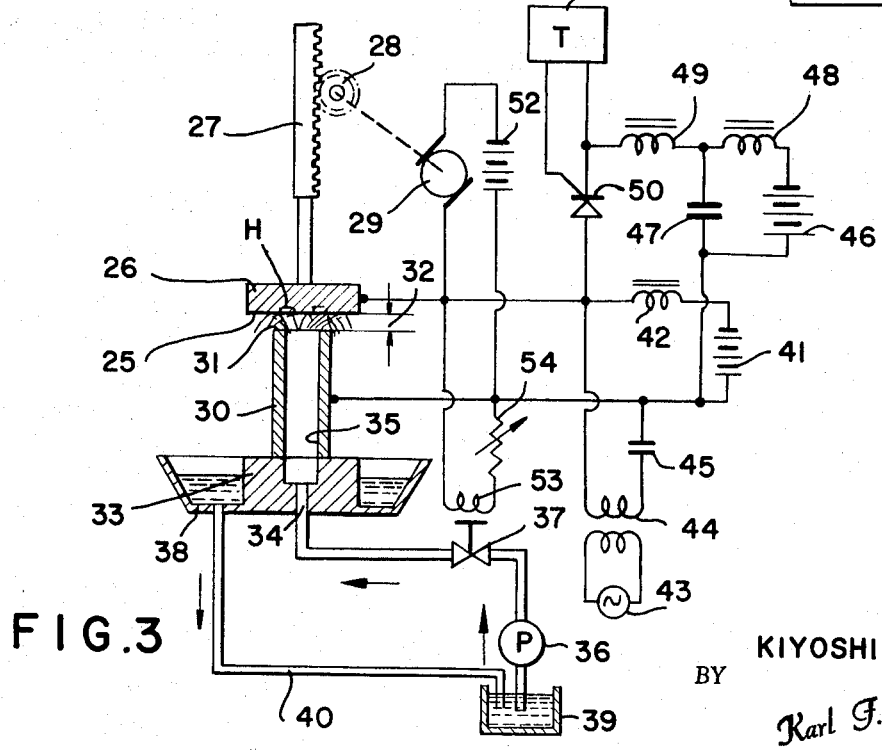

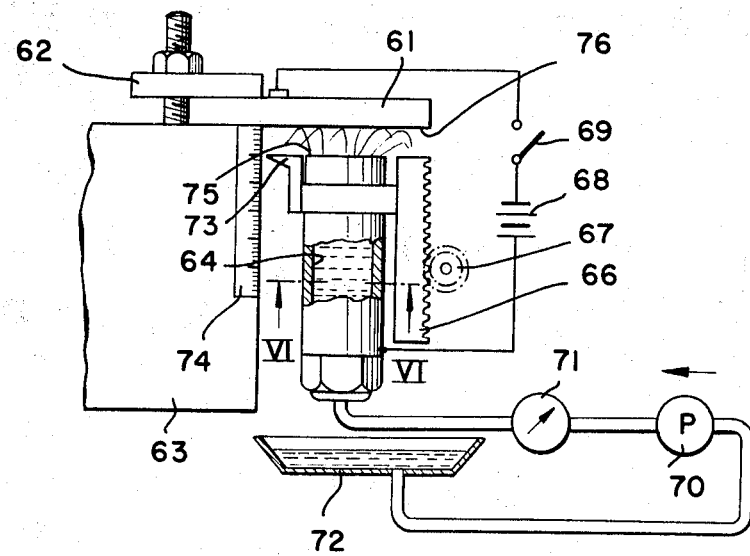
FIG. 5
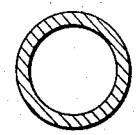
FIG.6
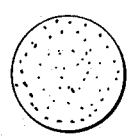
FIG.6-A
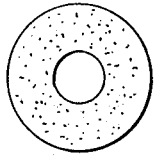
FIG.6-C
FIG.6-B   FIG.6-D
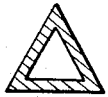
FIG.7
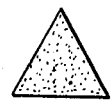
FIG.7-A
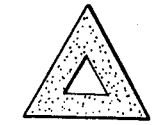
FIG.7-C
FIG.7-B   FIG.7-D
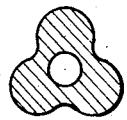
FIG.8
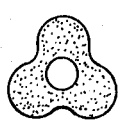
FIG.8-A
FIG.9-A
FIG.9
INVENTOR.
KIYOSHI INOUE
BY
Karl F. Ross
ATTORNEY

HEATING THE UNDERSURFACE OF A CONDUCTIVE BODY BY ELECTRIC CURRENT CONDUCTED THERETO BY A SHAPED STREAM OF ELECTROLYTE

The present invention relates to a method of and an apparatus for the localized electrolytic heating of metallic bodies and the diffusion into at least surface zones thereof of a substance with which the surface is treated.

In the prior U.S. Pat. No. 3,188,245 issued 8 Jun. 1965 to Kiyoshi Inoue, U.S. Pat. No. 3,198,675 issued 3 Aug. 1965 to Kiyoshi Inoue, U.S. Pat. No. 3,232,747 issued 1 Feb. 1966 to Kiyoshi Inoue and U.S. Pat. No. 3,356,601 issued 5 Dec. 1967 to Kiyoshi Inoue, there are described techniques in the electric discharge heat treatment of metals in electrolyte whereby a metallic surface is heated by combined electrolytic action and electric discharges over the surface of a workpiece immersed in an electrolyte bath, the discharging being promoted by electrolytic development of a layer of gas at the interface between the electrolyte and the workpiece. The heat treatment may be used for metallurgical effects, for promoting the formation of alloys or for depositing surface layers of materials upon the workpiece. The last-mentioned patent further describes techniques whereby diffusion into at least surface zones of the workpiece is promoted by the application of high potential gradients at or across these surfaces.

In general, the techniques set forth in the aforementioned patents are suitable for the generalized heating of substantially all of the metallic surfaces immersed in the electrolyte bath. Frequently, however, it is desirable to localize the heat treatment and to effect diffusion into only limited zones of the workpiece. It has been found to be impractical to use techniques analogous to those of the electroplating art for such localized heating; thus, masking a counterelectrode immersed with the workpiece in an electrolyte bath does not adequately confine the electrolytic heating of the workpiece, while masking of the workpiece is often inconvenient and insufficiently flexible for all purposes.

It is the principal object of the present invention to provide an improved method of electrolytically heating metallic workpieces whereby the heating may be confined precisely to limited areas of the workpiece surface without the inconveniences of masking or the care necessary for limited immersion of the workpiece in an electrolyte.

Another object of this invention is to provide an improved method of localized diffusion of a substance into at least surface zones of a workpiece whereby the diffusion area can be controlled both as to configuration and size.

Still another object of the instant invention is the provision of a method of imprinting, decorating or coloring restricted surface zones of a metallic workpiece in a simple, inexpensive and effective manner suitable for workpieces which are too bulky or massive for treatment by conventional printing and decorating techniques.

A further object of this invention is the provision of a highly controllable method of localized heating of a metallic workpiece and/or diffusion impregnation thereof.

It is still another object of this invention to provide improved apparatus for the localized beating and control diffusion of surface zones of a metallic workpiece.

It has now been found, surprisingly, and after much investigation, that it is possible to localize the heat treatment and diffusion along a metallic workpiece surface by directing therealong or thereagainst a moving stream of electrolyte and applying across the gap spanned by this moving stream, an electrolytic-heating current with or without electrodischarge as described in the aforementioned patents, to heat the zone of the workpiece subjected to the jet of electrolyte. While one would normally expect an unconfined or only limitedly confined stream of electrolyte, which serves as an electrolytic bridge between the electrodes (i.e. the workpiece and a counterelectrode) to form an uncontrolled electrolysis system with effect unlimited by the shape of the counterelectrode or its configuration, these investigations have demonstrated that the contrary is true. In fact, when a jet of liquid is directed from a generally tubular nozzle, which may serve as the counterelectrode, against the workpiece surface to be treated, the electrolytic-heating action is confined substantially to the outlines of the jet at the instant at which it impinges upon the workpiece surface, with substantially no extraneous electrolytic action between the scattered, dispersed or deflected liquid and the workpiece. Furthermore, it has been observed that both configuration of the electrolytically heated zone and the dimension thereof can be carefully regulated by adjustment of the distance of the nozzle from the surface and the type of flow emerging from the nozzle. In other words, when the jet emerging from the nozzle is essentially laminar flow as it spans the gap and prior to the instant of impact, and the counterelectrode is the tubular nozzle, the electrolytic-heating current flow in the liquid stream is confined substantially to a laminar shell or boundary layer of the liquid, and a substantially annular pattern may be formed on the workpiece. When, however, the nozzle is pointed from the workpiece by a greater distance, the laminar shell of conducting liquid is widened until finally the entire cross section of the jet is effectively filled by electrolytic heating action. Preferably the spacing ranges from 0.1 mm. to about 10 mm. while the applied voltage is 60 to 120 volts DC.

According to a further feature of this invention, the tubular counterelectrode and nozzle is a graphite body through which the electrolyte is circulated axially and is mounted for movement perpendicularly to the workpiece or is held stationary so that relative displacement of the workpiece and the tube can be effected by displacement of the workpiece. The outlet end of the graphite nozzle, which should have a substantially uniform cross section over at least a major portion of its length proximal to its mouth so as to promote the formation of a laminar jet, has a configuration corresponding to that which it is desired to apply to the workpiece. In an alternative arrangement, especially suitable for the localized heating of internal cavities of a workpiece, the electrolyte circulation is effected through these cavities and it is the lateral portion of the laminar boundary layer of electrolyte which sustains the heating action rather than the cross section of the jet as in the system previously described.

In both cases, another feature of this invention provides that the circulation of electrolyte be continued after termination of the electric current flow to cool the previously heated surface; here, the electrolyte acts simultaneously as a coolant. It has also been found that diffusion penetration of the workpiece can be promoted by the application of a relatively high-frequency alternating current filled between the counterelectrode and the workpiece in superimposition upon the electrolytic-heating current (e.g. as described in general terms in U.S. Pat. No.3,356,601), the superimposed alternating current having a frequency of 1 kHz. to 5 mHz. A low-frequency alternating current (e.g. 30 to 500 Hz.) may also be used to promote the electrolytic-heating action.

The above and other objects, features and advantages of the present invention will become more readily apparent from the following description, reference being made to the accompanying drawing in which:

FIG. 1 is an axial cross section view illustrating the application of the present invention to the electrolytic heating of an internal cavity of the workpiece according to the principles of the present invention;

FIG. 2 is a cross-sectional view along the line II–II of FIG. 1;

FIG. 3 is a diagram of an apparatus for the localized electrolytic heating and diffusion of a flat workpiece surface;

FIG. 4 is a view of this surface after such heating;

FIG. 5 is an elevational view, partly in cross section and in diagrammatic form, of another apparatus embodying this invention;

FIG. 6 is a cross-sectional view along the line VI–VI of FIG. 5 representing a section through the nozzle;

FIGS. 6A through 6D are views of the patterns obtainable with this electrode;

FIG. 7 is a view similar to FIG. 6 of another nozzle electrode of triangular section;

FIGS. 7A—7D are views of the heating patterns thereof;

FIG. 8 is a section through an electrode of polycuspid configuration;

FIG. 8A is a diagram of the pattern obtainable therewith;

FIG. 9 is a section through still another electrode; and

FIG. 9A is a diagram of the pattern obtained therewith.

In FIG. 1, there is shown a system for heat-treating a metallic workpiece 1 along an annular zone 2 surrounding a central bore 3 using a circulating electrolyte according to the principles of the present invention. In this system, the workpiece 1 is clamped between a pair of electrically insulating plates 4 and 5 by bolts 6 running parallel to the bore 3. The plates 4 and 5 are provided with aligned openings 7 and 8 which register with the bore 3 and are coextensive therewith so that the inner surface of each of the openings is flush with the inner wall 9 of the bore 3. The plates 7 and 8 are formed with tubular bosses 10 and 11 into which graphite sleeves 12 and 13 are threaded to form counterelectrodes for an electrolytic heating system whose other electrode is constituted by the workpiece 1. A pair of tubes 14 and 15 communicate with the electrodes 12 and 13 and sustain a circulation of electrolyte in the direction of arrow 16 as induced by a pump 17. The pumping rate is such that the electrolyte flows in a laminar stream whereby the boundary layers 18 of the flow form electrolytic bridges between the workpiece and the electrodes 12 and 13. The electrolytic heating current is supplied by a DC source 19 connected in series with a choke 20 across the electrodes 12, 13 and 1, the electrodes being bridges by a high-frequency AC source 21 which applies the primary winding of a coupling transformer 22 whose secondary winging lies in series with a DC blocking capacitor 23 across the electrodes. The heated zone is represented at 2 in FIG. 2.

EXAMPLE I

Using the apparatus of FIG. 1, a workpiece having a diameter of 5 mm. is heat-treated as described in the aforementioned patents with a zone of 2 mm. thickness using an applied voltage of 110 volts DC at 15 amp. The bore was 10 mm. long. The body of S55c steel was effectively tempered in this heating zone. It was found that alloying and diffusion could be promoted in the heated regions by this technique. The electrolyte was a 25 percent aqueous solution of potassium acetate and was circulated at a rate of about 4.5 liters/min. at a temperature of 65° C. The electrolytic-heating current was applied for about 45 minutes and then terminated. Electrolyte continued to circulate to cool the workpiece.

In FIGS. 3 and 4, there is shown an apparatus for the electrolytic heating and diffusion of a flat workpiece surface 25. The workpiece 26 is carried by a rack 27 driven by a pinion 28 and a motor 29. The counterelectrode is here constituted by a tubular nozzle 30 composed of graphite and of substantially uniform cross section, the nozzle 30 having a mouth 31 spaced from the workpiece surface 25 by a gap 32 bridged by the electrolyte jet. The electrode 30 is mounted upon a stationary support 33 whose electrolyte inlet 34 registers with the bore 35 of the nozzle 30 and is supplied by a pump 36 via an electromagnetically controlled valve 37. The electrolyte is connected via a pan 38 and returned to the reservoir 39 via a line 40.

The power supply here includes an adjustable DC source 41 connected in series with a choke 42 for sustaining the electrolytic heating current along the principles described in the aforementioned patent. In addition, an AC source 43 is connected via its transformer 44 and a DC blocking capacitor 45 across the electrode system formed by the workpiece 26 and the electrode 30. A pulse source may also be provided and may comprise a DC source 46 adapted to charge a capacitor 47 through a choke 48 blocking current surges through the DC source 46. The capacitor 47 can discharge through the pulse-shaping choke 49 upon the triggering of a solid-state controlled rectifier (SCR) 50 whose gate is triggered by the timer 51 adapted to oscillate at a frequency of about 5—30 kHz. Motor 29 lies in series with a battery 52 across the gap 32 while the coil 53 of electromagnetic valve 37 is connected in series with the potentiometer 54 across the electrode system. It will be apparent, therefore, that the system 41 and 42 is adapted to apply the conventional electrolytic heating direct current across the gap 32 between the electrode 30 and workpiece 26 while system 34—45 superimposes a high frequency (1 kHz. to 5 mHz.) thereon. Square wave or spike pulses may be applied by the system 46—51 to the electrodes 26, 30 while motor 29 and coil 53 respond to these pulses to relatively displace the workpiece and electrode in a vibrating mode and pulse the electrolyte flow.

In FIG. 4, the stippling represents the pattern 60 formed on surface 25 of the workpiece 26. It will be evident that heating has occurred only in an annular zone corresponding to the laminar shell of electrolyte impinging in the zone H illustrated in FIG. 3.

EXAMPLE II

Using the system illustrated in FIG. 3, S55c carbon steel was treated with an aqueous electrolyte (15 percent by weight potassium acetate) for a treatment period of 24 seconds and a gap 32 of 2 mm. Prior to the treatment, the Rockwell hardness of the surface 25 was found to be 65 RC. The cross-sectional configuration of the electrode 30 was that of an equilateral triangle (see FIG. 7) with sides of an external dimension of 10 mm. and a wall thickness of 2 mm. The electrode was composed of graphite. Fluid was circulated at a rate of about 4.5 liters/min. and the applied current was 90 volt DC from the source 46—51 with a pulse width and spacing of 0.5 msec. No high-frequency alternating or continuous DC current was applied. After the indicated treatment time, it was found that a heat-treatment depth of 3 mm. was obtained with an increase in hardness to 222 RC. With continuous DC at 118 volts for a period of 11 seconds, the hardness was raised to 222 RC.

It was found that hardness could be increased still further by using the system 27, 28, 29, 52 to apply a vibration in the direction of electrolyte current flow of 0.5 mm. at 50 cycles/sec., a high-frequency alternating current of 1 kHz. to 5 mHz., preferably to 10 to 30 kHz., and with combinations of high frequency, vibration and electrolyte pulsing at a rate of about 100 pulses/sec. to 1,000 pulses/sec.

It was found that improved heating could be obtained by adding glycerine to the electrolyte (in an amount up to 10 percent) and that the system permitted localized heating to depths of less than 10 mm. with greater intensity than is possible with immersion-type electrolytic heating using similar power and in which dissipative heating to depths of 20 to 25 mm. are not unusual.

FIG. 5 represents still another apparatus for the heat-patterning, treatment and diffusion of a workpiece 61 which is held by a clamp 62 in a head 63 of a heat-treatment apparatus. An upwardly directed tubular graphite nozzle 64 is held by a ring clamp 65 in a vertical slide 66 forming a rack driven by the pinion 67. A DC electrolyte-heating source 68 is connected in series with a switch 69 across the electrode 64 and the workpiece 61. Electrolyte is supplied to the electrode 64 by a pump 70 through a flow meter 71 from a reservoir 72 serving as a collector tray for the electrolyte. A pointer 73 is carried by the electrode 64 and cooperates with a fixed scale 74 to indicate the spacing of the mouth 75 of the nozzle from the workpiece 76, In FIGS. 6, 7, 8 and 9, there are shown various mouth configurations for the electrode 64 while FIGS. 6A—6D, FIGS. 7A—7D, FIG. 8A and 9A represent the patterns obtained on the surface 76 as described hereinafter in connection with the specific Examples.

EXAMPLE III

The workpiece 61 was a square with a length and width of 40 mm. and a thickness of 6 mm. and was composed of SK 7 steel. The circulated electrolyte was a 25 percent aqueous solution of potassium acetate at 65° C. while the electrode 64 was composed of graphite. With a workpiece-electrode spacing of 10 mm., an applied voltage of 85 volt DC an electrolyte flow rate of 4 liter/min. and a machining time of 33 seconds, the pattern obtained with the electrode of FIG. 6 (outer diameter 10 mm., inner diameter 8 mm.) was that of FIG. 6A and corresponded to a circle heated uniformly over its entire area and with a diameter of 10 mm. ±0.5 mm.

When the electrode-workpiece spacing was reduced to 5 mm., with an applied voltage of 85 volt DC an electrolyte circulation rate of 4.5 liter/min. and a treatment time of 35 seconds, the shape of the heated pattern corresponded to that illustrated in FIG. 6B.

With an electrode-workpiece spacing of 3 mm., a voltage of 90 volts DC an electrolyte flow rate of 4 liter/min. and a treatment time of 38 seconds, the pattern of FIG. 6C was obtained.

Practically total conformity with the electrode configuration was obtainable (FIG. 6D) when the electrode-workpiece spacing was reduced to 2 mm.; the applied potential was 90 volt DC, the electrolyte flow rate was 6 liter/min, and the heating time was 40 seconds. At the termination of this period, electrolyte was directed against the workpiece at a rate of 3 liter/min. to cool the workpiece. The dimensions of the heated pattern corresponded to those of the electrode wit a tolerance of ±0.5 mm.

EXAMPLE IV

Using the electrode illustrated in FIG. 7, with equilength sides of 10 mm. and wall thickness of 2 mm., and the conditions described in Example III except for those set forth below, it was possible to obtain the patterns of FIGS. 7A—7D. With an electrode-workpiece spacing of 10 mm., a potential of 85 volt DC an electrolyte flow rate of 4 liter/min. and a treatment time of 35 seconds, the entire pattern within the outline of the electrode was uniformly heat-treated (FIG. 7A). With an electrode-workpiece spacing of 3 mm. at 90 volts and an electrolyte circulation rate of 4 liters/min., the pattern of FIG. 7B was obtained after 40 seconds.

With a spacing of 7 mm. between electrode and workpiece, an applied voltage of 90 volt DC, an electrolyte circulation rate of 4.5 liter/min. and a treatment time of 40 seconds, followed by advance of the electrode to a distance of 0.5 mm. from the workpiece and circulation of electrolyte as a coolant at a rate of 2 liter/min., a pattern as shown in FIG. 7C was obtained. A substantially precise duplication of the electrode cross section was obtained (FIG. 7D) when the heating was carried out with the electrode at a distance of 3 mm from the workpiece, 90 volt DC applied potential, 4 liters/min. electrolyte circulation rate and 42 sec. treatment time, followed by cooling with the electrode 0.5 mm. from the workpiece and an electrolyte circulation rate of 2 liters/min.

EXAMPLE V

Using the electrode illustrated in FIG. 8 and conditions otherwise as given in Example III, a substantial duplicate of the electrode cross section could be obtained (FIG. 8A) with electrolytic heating at 90 volts DC, 4 mm. electrode-workpiece spacing, 5 liters/min. electrolyte circulation rate and 50 seconds treating time, followed by cooling of the surface with an electrode-workpiece spacing of 0.5 mm. and an electrolyte flow rate of 2 liters/min.

EXAMPLE VI

The heating pattern of FIG. 9A, substantially identical to the cross section of the electrode used (FIG. 9), was obtained under the conditions of Example III except that the treatment time was 45 seconds, the electrolyte flow rate was 5.5 liters/min., the applied voltage was 90 volts DC and the electrode-workpiece spacing was 4 mm.; the heating step was followed by cooling at an electrode-workpiece spacing of 0.5 mm. and an electrolyte flow rate of 2 liters/min.

It was found that an addition of glycerine in an amount of 5 percent by weight to the electrolyte improved the heating rate and allowed a reduction of the heating time in each case. Similar improvement was obtained by pulsing the electrolyte vibrating the workpiece and superimposing a high-frequency AC on the system as described earlier.

The invention described and illustrated is believed to admit of many modifications within the ability of persons skilled in the art, all such modifications being considered within the spirit and scope of the appended claims.

I claim:

1. A method of applying a predetermined pattern to a surface of a metallic workpiece, comprising the steps of
   a. forming a graphite tubular electrode having a mouth adapted to eject a jet of an electrolyte with a cross section corresponding to said pattern;
   b. mounting said workpiece with said surface facing downwardly and training said mouth of said electrode thereagainst at a distance of 0.1 to 10 mm. from said surface;
   c. forcing a stream of electrolyte through said electrode and from said mouth against said surface without lateral restraint of said electrolyte;
   d. applying an electrolytic-heating current between said electrode and said workpiece, thereby forming a pattern on said surface of a shape corresponding to the configuration of the jet cross section at the mouth of the electrode; and
   e. terminating said electrolytic heating current and continuing the projecting of said stream against said workpiece to cool the latter.

2. In a method of the electrolytic heat-treatment of metallic workpieces, the improvement which comprises localizing the heating at a selected surface region of a metallic workpiece to form there a heat-treated pattern of a predetermined configuration and area, by preparing an electrode nozzle formed at its mouth with a conductive face shaped to have a configuration and area corresponding to those of said pattern, spacedly juxtaposing said nozzle with said surface region with said mouth and said conductive face confronting upwardly said surface region to form a gap of spacing adjusted at 0.1 to 10 mm. while directing an electrolyte in moving stream through said nozzle and said mouth against said region to cause it to span the gap when it passes between said conductive face and said surface region, said electrolyte being free from lateral restraint while spanning said gap and cascading downwardly after issuing from said gap, and passing an electrolytic-heating current across said electrode nozzle and said workpiece through said electrolyte in moving stream spanning said gap and terminating said current while maintaining said electrolyte passing through said gap to permit said heated surface to cool.

3. The improvement defined in claim 2 wherein said nozzle is composed of graphite and is spaced from said surface by a distance of about 0.1 to 10 mm.

4. The improvement defined in claim 3 wherein said electrolyte is an aqueous salt solution containing up to 10 percent by weight glycerine.

5. An apparatus for the electrolytic heating of a metallic workpiece surface comprising:
   a shaped graphite nozzle trained upwardly upon said surface across a gap of 0.1 to 10 mm.;
   means for forcing an electrolyte through said nozzle in a jet tranversing said gap without lateral restraint and impinging upon said workpiece to fall freely therefrom upon such impingement;
   power supply means connected across said workpiece and said nozzle for passing an electrolytic-heating current for the laterally unrestrained jet traversing said gap and impinging upon said workpiece surface; and
   means for maintaining the flow of electrolyte against said workpiece upon termination of the electrolytic-current therethrough to cool said surface.